June 20, 1944.   R. A. BECKWITH   2,352,068
EXCAVATING, LOADING AND DUMPING VEHICLE
Filed Feb. 1, 1943   2 Sheets-Sheet 2
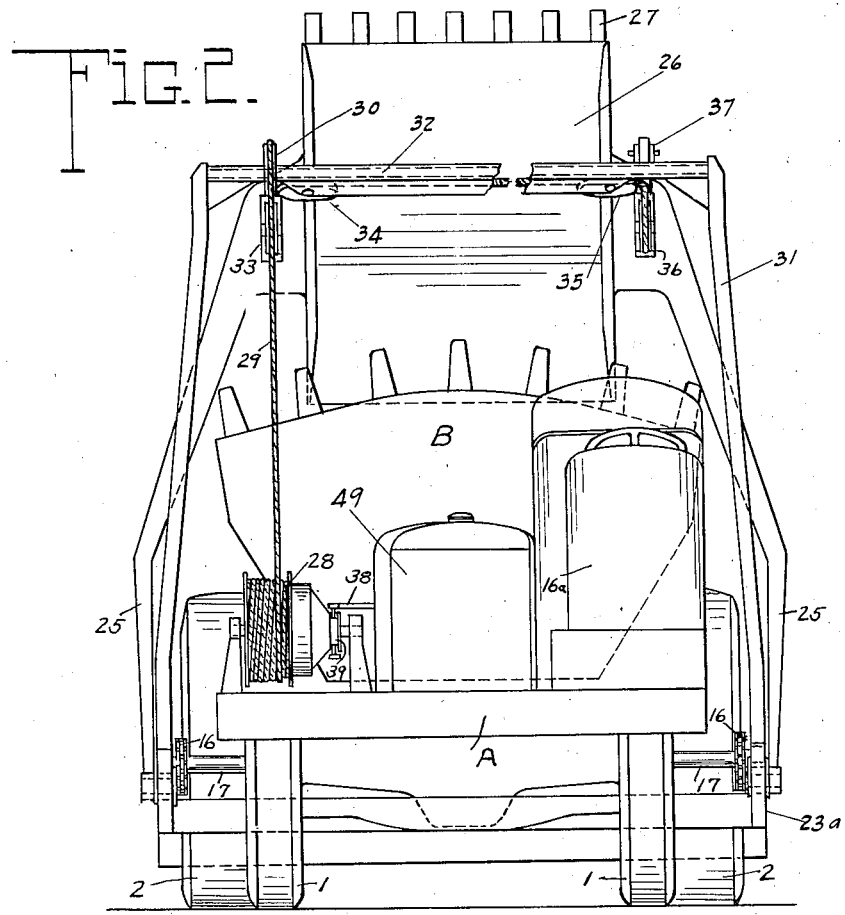
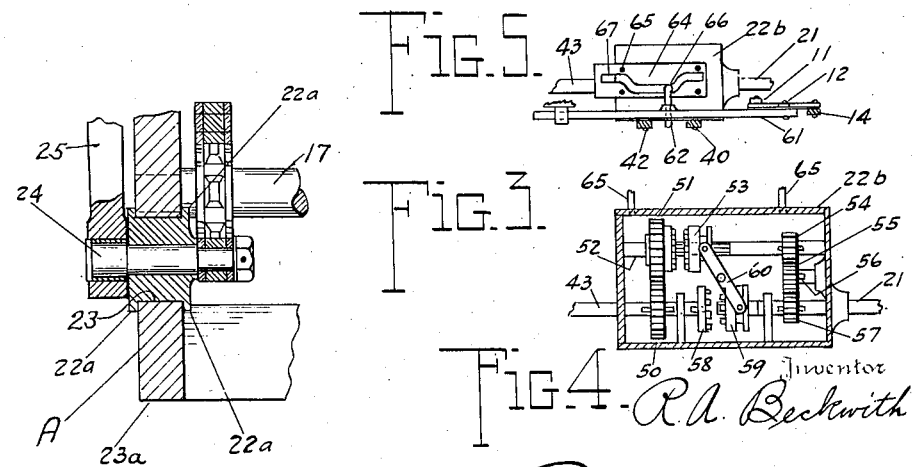

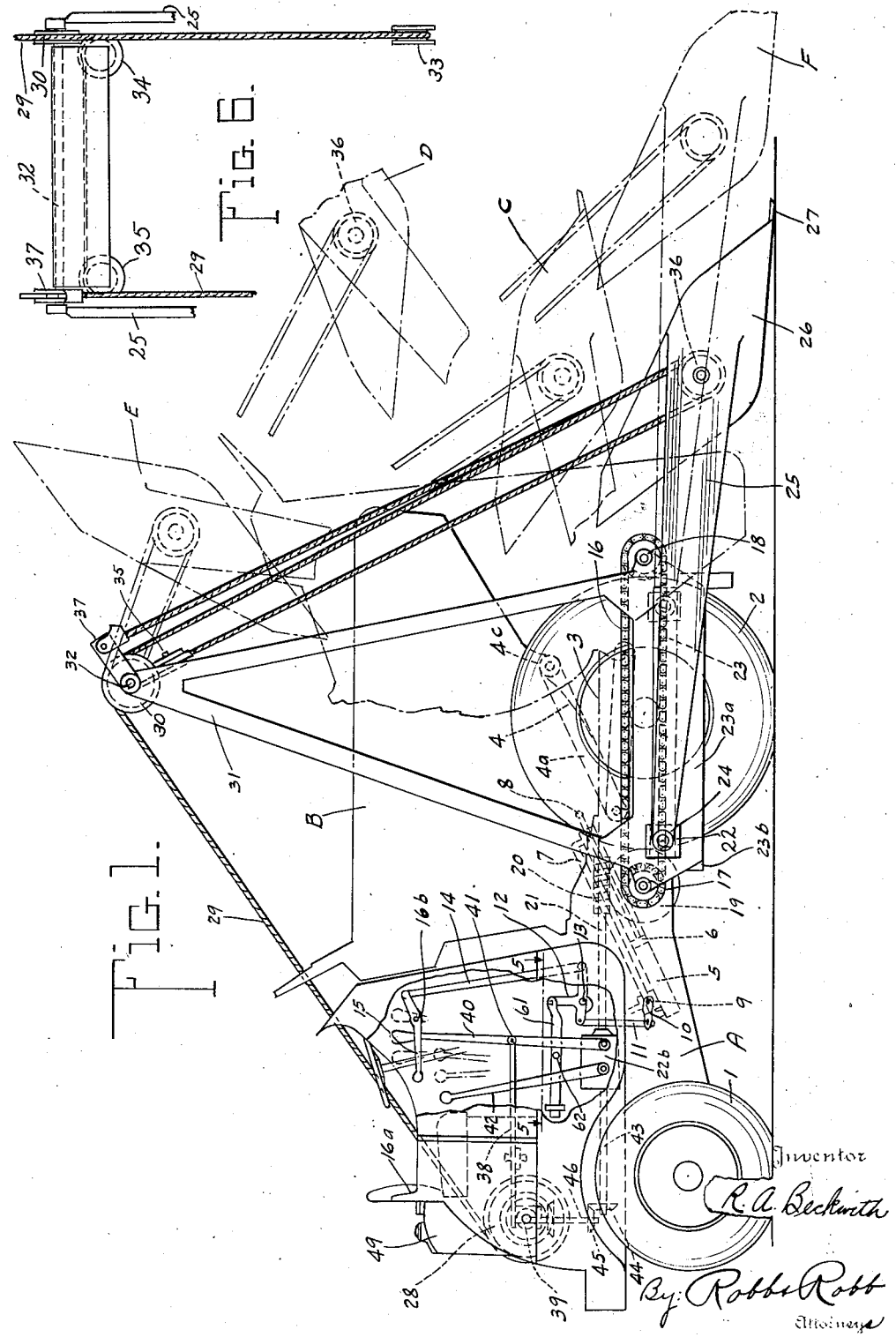

Patented June 20, 1944

2,352,068

UNITED STATES PATENT OFFICE 2,352,068

EXCAVATING, LOADING, AND DUMPING VEHICLE

Raymond A. Beckwith, Milwaukee, Wis., assignor to Koehring Company, Milwaukee, Wis., a corporation Application February 1, 1943, Serial No. 474,333

8 Claims. (Cl. 214—78)

The object of this invention has been to design a novel type of vehicle adapted for conveying dirt, or the like, from place to place, having dumping equipment to cause dumping action of the vehicle, and other equipment, or what may be termed self loading instrumentalities, capable of doing excavating work and loading the dumping feature of the vehicle with dirt, or the like, excavated by the excavating means employed.

A further object of the invention has been to combine excavating instrumentalities with a dumping vehicle of the type wherein the body of the vehicle comprises a dumping body shiftable bodily to dump at the front end thereof, after being loaded, and after the vehicle has been moved under power to a suitable point, such as a fill, where the dirt or loaded contents are to be deposited.

In the carrying out of the invention, I provide a vehicle preferably driven under its own power by a suitable power plant, or engine, carried thereby, having a forward dumping body, as previously stated, and equipped with a forwardly operable excavating and loading bucket or dipper, which dipper is adapted to be raised and lowered in its operating cycle, raised in order to dump its contents into the dumping body, and lowered to position the dipper scoop or shovel ready to be operated by suitable mechanism for doing its excavating work.

While the excavating means preferably used in conjunction with my vehicle are susceptible of advantageous employment in conjunction therewith, these means may be rendered idle should it be desired to use the vehicle as a carrying and dumping vehicle only. Special instrumentalities are employed whereby to ensure that in the operation of the vehicle as a dumping body construction, there will not be any interference between the excavating instrumentality and the dumping body in their operations such as to preclude proper action of the body when in use. The latter means includes a safety feature comprising mechanism whereby the excavating device is adapted to be raised out of interfering position automatically when the dumping operation of the dumping body is to be compelled or resorted to. This means, according to the construction of the present unit, is necessary because the excavating instrumentality is, under certain conditions, located in a position or positions that would prevent the dumping of the vehicle properly for the purposes of the invention.

One preferred embodiment of the invention is illustrated in the accompanying drawings, in which:

Figure 1 is a side elevation of a dumping and excavating vehicle, including the essential features of the invention, the rear portion of the side of the vehicle being broken away to disclose illustratively certain of the controls for the various parts of the vehicle, notably the dumping body, the operation means for the excavating scoop or dipper, and the hoisting means for the said scoop or dipper by which it is raised to deposit the excavated materials received thereby, into the dumping body of the vehicle.

Figure 2 is a rear elevation of the vehicle, the loading and excavating scoop or dipper being raised into its upward dumping position for discharging its contents into the dumping body.

Figure 3 is a fragmentary sectional view of the manner in which the slide blocks and slides are engaged, looking toward the front of the machine from the left, in Figure 2.

Figure 4 is an enlarged fragmentary detail view bringing out more clearly the drive gearing employed for reversibly operating the slide blocks and moving the chains therefor, by which the dipper is shifted back and forth in its digging operations.

Figure 5 is a fragmentary top plan view about on the line 5—5 of Figure 1, showing part of the safety instrumentalities for moving the dipper.

Figure 6 is a diagrammatic view of the reeving of the cables, for raising and lowering the dipper.

Referring primarily to Figure 1 of the drawings, I illustrate generally at A the chassis of a dumping truck type of vehicle, the same being mounted upon the front supporting wheels 2 and the rear steering wheels 1. The chassis carries at its front portion supported in a rocking manner upon the sides thereof, the tilting dumping body B, the body B being carried directly by the chassis or framework upon a suitable support such as 3 on which the rocker portions 4 at the bottom of the body B may rock so that the body B may tilt into the dotted line position shown in Figure 1, when dumping and may then be moved rearwardly to restore it to its upright or load receiving position.

Any suitable means may be employed for rocking the dumping body B, and as illustrated in the drawings, I may avail of an hydraulic cylinder 5, containing an operating piston 6, the pressure of a suitable fluid medium being adapted to be admitted to the cylinder 5 at opposite ends by means of a conduit 7 to which the pressure fluid, either liquid or air, may be supplied from a suitable tank, not shown.

The piston rod of the piston 6 is connected as at 8 with a side of the dumping body B, and longitudinal movement of the parts 6 and the piston rod of the cylinder 5 will enable the body B to be pushed or pulled at the point or points 8 for dumping and restoring operations respectively. If desired, the cylinder 5 may be duplicated at opposite sides of the frame or chassis A, so as to permit the pistons 6 in duplicate to be connected with opposite sides of the body B. Links 4a are provided, pivoted at 4b to the chassis A, and at 4c to the body B so as to prevent undesired lateral displacement of the body and limit endwise movement thereof.

The control of the pressure fluid in the conduit 7, and, therefore, its admission to the opposite ends of the cylinder or cylinders 5, is effected by means of a three-way valve 9 operated by the valve arm 10. The valve arm 10 is connected by a link 11 to a three-armed crank lever 12, pivoted to the vehicle frame at 13. The lever 12 is connected by one arm through a link 14 to a hand lever 15 near the operator's station, or seat 16a, which is located at the rear end of the vehicle so that the operator faces forwardly.

The hand lever 15 is pivoted to any suitable supporting bracket, not shown, as at 16b, and is readily within the reach of the operator at the seat 16a. It will be obvious that by raising and lowering the rear end or handle of the lever 15, the crank lever 12 may be properly shifted to actuate the valve arm 10 to adjust the three-way valve 9, so that the latter may assume a neutral position, maintaining the body B in its position of full lines in Figure 1, a second position to admit pressure fluid to the lower end of the cylinder 5 and cause dumping action of the body B, and a third position admitting the pressure fluid to the upper end of the cylinder 5 for restoring the body B to its normal loading position of full lines in Figure 1. The valve 9 is a conventional rotary type three-way valve well known in the art, as used in the manner above described.

The loading and excavating device used as a part of the invention will now be described.

At the opposite sides of the chassis A of the vehicle are located operating sprocket chains 16, a pair of which are employed, one at each side of the chassis A. These sprocket chains 16 pass around sprockets carried by cross shafts 17 and 18, the latter located near the front end of the chassis. The rear cross shaft 17 carries a worm gear 19 fixed thereto and engaging a worm 20 on a horizontal driven shaft 21 disposed longitudinally of the chassis A, the rear end of said shaft 21 entering a transmission gear housing 22b. Operation of the shaft 21 in opposite directions will turn the worm gear 19 in opposite directions, and since the rear sprockets for the chains 16 are fixed to the shaft 17 in the above manner, the chains 16 may be moved forwardly and rearwardly as respects the upper and lower laps thereof. The lower lap of each of the chains 16 is attached by a certain link thereof to a slide block 22, one of which is provided at each side of the chassis A. These slide blocks 22, two in number, are adapted to move in guide openings or slots 23 in members 23a at opposite side portions of the chassis A. At opposite sides of each slide block 22 are formed guide ribs 22a both above and below the block which ribs maintain each block 22 in proper sliding engagement with the side members 23a having the slots or openings 23 in which the blocks 22 slide, the said members 23a being suitably supported outwardly with respect to the driving wheels 2 so as to provide outboard bearing means for the shafts 17 and 18 and to be at least partially supported thereby. A suitable cross brace 23b extending transversely of and beneath the chassis A connects the said members at opposite sides of the body and is connected to the chassis providing additional support for the members 23a.

Thus it will be seen that by moving the chains 16 in a reversible manner, the slide blocks 22 may be caused to move forwardly and rearwardly. Each slide block 22 is provided with a short pivot shaft 24, which enters a pivot opening in the rear end of a dipper arm 25, one of which is located at each side of the chassis A. Preferably, the arms 25 increase in vertical cross sectional area, toward their front ends which terminate at the opposite sides of the digging bucket or dipper 26, and said arms 25 are integral with or welded to said sides of the bucket or dipper 26. The dipper 26 is provided at its front end with excavating teeth or scraper blades 27, the latter illustrated as if a plurality is employed, though a single scraper and digging blade might be utilized, if desired, dependent somewhat upon the nature of the work which is to be done by the vehicle or machine.

Obviously, a forward movement of the arms 25 while the dipper 26 is adjusted to the full line position in Figure 1 will cause a forward movement of the dipper, capable of effecting digging and earth scraping operations, in an obvious manner. A rearward dipper movement of the arms 25 retracts the dipper so as to make the same ready for the next digging or excavating action.

Now since the dipper 26 is employed as a loading means for the dumping body B, there are provided suitable instrumentalities for raising or hoisting the dipper and for lowering same. These instrumentalities comprise preferably cable and drum means including an operating drum 28 having a cable 29 reeved thereabout, and adapted to wind and unwind relative thereto.

The cable 29 leads over a sheave 30 at the peak or upper end of one side of an A-frame 31, which comprises a unit composed of spaced sides, the lower ends of which are integral with and suitably supported on the members 23a at opposite sides of the chassis A. The sides of the A-frame 31 are connected together by a cross shaft 32 at the upper ends thereof, and the sheave 30, previously referred to, is carried by said cross shaft near one end thereof. The A-frames are susceptible of being removed as units carrying the chain and slide block mechanisms previously described, therewith upon disconnecting the members from the shaft 32 and disengaging the shafts 17 and 18 and the cross member 23b therefrom. For all practical purposes, however, the A-frames may be considered as part of the chassis construction, at least in so far as the members 23a are concerned, although the feature of removability thereof provides certain advantages apparent to those skilled in the art, one advantage consisting in the use of the digging member and its associated mechanism with various types of load carrying vehicles. From the sheave 30, the cable 29 leads down or to the dipper 26 and over a sheave 33 on a side of the dipper 26 adjacent the side of the machine carrying the sheave 30. From the sheave 33, the cable 29 passes upwardly and around a sheave 34 at the top of the A-frame, thence crosswise of the machine around a sheave 35 at the opposite side of the A-frame, thence downwardly around another sheave 36 on the inner side of the bucket of the dipper 26, and thence upwardly to a point 37, where it is deadended at the top of the side of the A-frame 31 opposite the pulley 30.

By operation of the drum 28 in one direction, winding up of the cable 29 on the drum is effected, whereby to raise the dipper 26 to different positions that in the drawings are shown by dotted line illustrations of the dipper at positions denoted C, D, and E. The position F in dotted lines is the forward digging or lowered position of the dipper as illustrated in Figure 1.

For actuating the drum 28, any suitable mechanism may be employed such as conventionally used for operation of windlass drums, including clutch means for driving the drum for winding the cable 29 operable to release said drum, and brake means adapted to be applied to the drum for braking its movement during unwinding from the drum 28. Clutch and brake drum means, such as illustrated in the Patent of Brey No. 1,947,823, issued February 20, 1934, may be used for the above purpose. The clutch throw member for the clutch means is shown at 38 at the left end of Figure 1, same connected with the clutch means 39, and in turn connected with the operating lever 40 at 41.

For the operation of the driven shaft 21 geared to the chain operating shaft 17, there may be employed any suitable reversible transmission gearing under the control of the lever 42, located at the same lever stand as are the levers 40 and 15, previously described.

Figure 4 illustrates a conventional construction of such reversible gearing, which is disposed in the transmission box or housing 22b, and which comprises the driving shaft 43 in longitudinal alignment with the shaft 21 and geared by gear and shaft members 44, 45, 46 to the driving shaft for the drum 28, which shaft in turn is operated from the engine 49 on the rear end of the chassis A. The shaft 43 carries the gear 50 fixed thereto and meshing with the gear 51, loose on the countershaft 52 and having a clutch member cooperable with the clutch member 53 on the shaft 52 and splined thereto.

On the shaft 52 is carried a fixed pinion 54 meshing with a reversing pinion 55 on shaft 56, said pinion 55 meshing with a pinion 57 fixed to the shaft 21. At the adjacent ends of the aligned shafts 43 and 21, are located the clutch member 58 on shaft 43 and the splined and slidable clutch member 59 on shaft 21. A rocking lever 60 to which the hand lever 42, previously referred to, is fixedly connected, is engaged at its upper arm with the clutch member 53, and at its lower arm with the clutch member 59, so that when the clutches 53 and 59 are both disengaged, the lever 42 will be in neutral position, and said lever may be shifted in opposite directions to alternately engage the clutch parts 53 and 59 with their contacting clutch parts.

With the foregoing understanding of the construction of the invention, its operation is generally outlined as follows:

It will be assumed that the parts of the loading, excavating and dumping vehicle are disposed in the full line positions of Figure 1. Thereupon, the vehicle may be driven under the power of its engine 49 suitably drivingly connected with the front wheels 2, in a forward direction or to the right, as seen in Figure 1. The dipper or scoop 26 will engage with the earth material and dig up the same to the desired depth dependent upon the degree of lowering adjustment of said dipper 26.

By operation of the lever 42, the arms 25 of the dipper 26 may be moved forwardly and rearwardly for digging operation of the dipper 26, either simultaneously with a forward movement of the vehicle under its own power, or independently of the vehicle movement, if the vehicle is stopped.

For the operation of the arms 25 and back and forth movement of the dipper 26 in excavating, by means of the chains 16 and blocks 22, the lever 42 will be actuated in directions opposite from its neutral position. When in neutral position, the lever 42 maintains the dipper 26 stationary relatively to the vehicle chassis.

Assuming that the dipper 26 has been filled with excavated material, the next operation is to hoist said dipper by actuation of the lever 40 until the dipper is in the dotted line position E of Figure 1, whereupon it will discharge its contents into the dump body B. The dump body B will be filled in the above manner with excavated material.

Thereupon operation of the lever 40 may cause paying out of the cable means 29 and the dipper 26 will be lowered to its position C of Figure 1 so that the operator of the vehicle may drive the vehicle forwardly with the dipper C out of his line of vision, until the fill or place of deposit of the excavated materials in the dump body B is reached.

When the fill or place of the deposit of the excavated materials has been reached, the operator of the machine may manually raise the dipper 26 to the position indicated D in Figure 1, by operation of the levers 40 and 42, so as to get the dipper out of the way of the dumping body B when the latter is caused to perform its dumping action. Thereupon, with the dipper 26 brakeheld in its position D, the operator will operate the lever 15 and thereby actuate the valve 9 so as to move the piston or pistons 6 outwardly in their cylinder or cylinders, to cause dumping of the body B of the vehicle to the position in dotted lines in Figure 1.

By reversing the direction of travel of the vehicle, while the dumping body B is being dumped, the material in the vehicle body may be spread as desired, or, if the vehicle is not moved rearwardly, said material will be deposited in a single batch on the site of deposit, or at the fill.

In order to provide against the contingency that the operator may forget to move the dipper 26 to its position D, as illustrated in Figure 1, from the travelling position of the dipper, as shown at C, safety instrumentalities are employed so that when the lever control for causing dumping action of the body B is initially actuated, the slide blocks 22 will be automatically moved outwardly so as to cause the dipper arms 25 and thus the dipper 26, to assume the position D of Figure 1.

For this purpose, the crank lever 12 is connected at its upper end with an actuating bar 61, adapted to slide rearwardly and forwardly of the machine, and having a pin or abutment 62 to engage the lever 42 and shift the latter rearwardly when the lever 15 is depressed preliminary to the operation of dumping the dump body B. Thus, the rearward push of the lever 42 by the actuation of the lever 15 will throw in the clutch means 53 and cause the slide blocks 22 to move outwardly by means of the chains 16. Since the cable means 29 has been previously braked to maintain the dipper 26 at least at an elevation as high as the elevation D, as shown in Figure 1. it will be seen that the cables act as links so that the bucket 26 will be raised incident to the out-thrust of the arms 25. Further actuation of the lever 15 will then effect the dumping action of the body B, the dipper or bucket 26 having been moved out of the way of the front end of the dumping body, ensuring that there will be no interference with the dumping action of the latter by any obstructing operation on the part of the dipper unit.

Since it is necessary that the operator of the vehicle be enabled to assume manual control of the lever 42 after the automatic action, just described, has taken place, means such as those shown in Figure 5 are provided for withdrawing the pin or abutment 62 from the line of movement of the said lever. This means comprise a cam plate 64 suitably mounted above the transmission housing 22b, by means of studs 65 so as to position the plate 64 inwardly of the actuating bar 61. The pin 62 is mounted in the bar 61 in an opening therein and extends rearwardly thereof. The inner end of the pin 62 carries a roller 66 thereon adapted to move in a cam groove 67 formed in the cam plate 64. The cam groove is formed so as to withdraw the pin 62 when the said pin has initially caused sufficient movement of the lever 42 to the left, see Figure 1, whereby the actuation of the slide blocks 22 is effected. The withdrawal of the pin will permit subsequent manual control of the slide blocks 22, as desired, and the dumping action of the body B by further movement of the lever 15, controlling the valve 9. The cam groove 67 is, likewise, formed so as to withdraw the pin 62 from the path of the lever 40 when the lever 15 is actuated to cause a return of the body B to its normal or loading position shown in full lines in Figure 1.

After the dumping body B is dumped at the fill, or the place of deposit of the materials loaded thereinto, the operator will lower the dipper 26 to a position substantially that illustrated at C in Figure 1 of the drawings, and then will drive the machine or vehicle back under its own power to the place of excavation, whereupon the operations previously rehearsed in order, will be proceeded with again.

It is contemplated that the vehicle of this invention shall be of the type whereby high speed travel movement is effected by the motor thereon, the power of said motor being availed of to operate the excavating instrumentalities as heretofore pointed out.

Having thus described my invention, what I claim as new and desire to secure by Letters Patent of the United States, is:

1. In an excavating and dumping vehicle of the class described, in combination, a portable supporting chassis adapted to be moved over the earth from a place of excavation to a place of deposit of earth materials, a dump body upon the chassis, means for shifting said dump body in an endwise direction of the chassis for causing dumping action thereof, an excavating dipper at one end of the chassis so disposed that in a certain position it will prevent dumping action of the body, means for raising the dipper to discharge its contents into the dumping body, and means for effecting dumping operation of the dumping body, together with instrumentalities for causing automatic movement of the dipper out of the way of the dumping body when the latter is operated to dump.

2. In an excavating and dumping vehicle of the class described, in combination, a portable supporting chassis, a dump body thereon, means for causing endwise tilting movement of the body for dumping action thereof, an excavating dipper mounted on the chassis at the dumping end of the body, means supporting the dipper independently of the body, means for moving the dipper longitudinally independently of its movement with the chassis, and means for elevating the dipper for causing the same to discharge its load into the dump body, the means for elevating the dipper comprising instrumentalities for holding the dipper in a position such that it will not obstruct movement of the dump body in its dumping action.

3. In an excavating and dumping vehicle of the class described, in combination, a portable supporting chassis, a dump body thereon, tiltable to dump at one end the contents thereof, an excavating dipper located at said dumping end of the body, means for moving the dipper longitudinally of the chassis out of the way of the dumping end of the body and for elevating said dipper to discharge its contents into the body, said last mentioned means comprising dipper arms slidably attached to opposite sides of the chassis, means for causing back and forth sliding movement of said dipper arms for effecting dipper excavating action of the dipper, and automatic instrumentalities cooperable with the dipper moving means for effecting movement of the latter preliminary to operation of the dumping body for effecting its dumping action.

4. In an excavating and dumping vehicle of the class described, in combination, a portable supporting chassis, a dump body thereon, tiltable toward one end for dumping action, an excavating dipper on the chassis and disposed in advance of the dumping end of the body, manual means for raising and lowering the dipper adapted to elevate the same to discharge its contents into the body, operating means for causing dumping action of the dump body, and automatic means operable by said operating means for the dump body to cause elevating action of the dipper.

5. In an excavating and dumping vehicle of the class described, in combination, a portable supporting chassis movable over the area to be excavated, a tilting dump body means to tiltably dump the body, an excavating dipper carried by the chassis operable to excavate earth materials, means to actuate the dipper to cause discharge of the materials excavated thereby into the body, and means operable incident to the dumping of materials from the body to shift the dipper out of the path of dumping movement of the body and out of the way of said materials as they are dumped.

6. In an excavating and dumping vehicle of the class described, in combination, a portable supporting chassis, a dumping body thereon, means for moving the said body to cause a rearward dumping action of the same, an excavating and loading bucket carried by the body, means for moving the bucket to elevate the same to a dumping position above the body in a path intersecting the path of movement of the rear end of the body when it is operated to dump, and means supporting the bucket independently of the body whereby the bucket may be raised to a position above the body to freely permit the rearward dumping action of the latter.

7. In an excavating and dumping vehicle of the class described, in combination, a portable supporting chassis, a dumping body mounted thereon, a loading bucket carried by the chassis movable in the path of movement of the body and operable to hoist materials to be dumped into the body, operating cables for elevating the bucket to a dumping position respecting the body, instrumentalities for causing dumping action of the body, means for holding the dumping cables from movement to maintain the bucket in a predetermined position related to the body, and mechanism operable incident to actuation of the dumping means for the body for causing movement of the bucket while supported by the cables to thereby shift the bucket out of the path of movement of the body preliminary to the dumping action of the latter.

8. In an excavating and dumping vehicle of the class described, in combination, a portable supporting chassis adapted to be moved over the earth from a place of excavation to a place of deposit of earth materials, a dump body upon the chassis disposable in a certain position to interfere with the dumping action of the body, an excavating dipper at one end of the chassis, means for raising the dipper to discharge its contents into the dumping body, and means for effecting dumping operation of the dumping body, together with instrumentalities for causing automatic movement of the dipper out of the way of the dumping body when the latter is operated to dump.

RAYMOND A. BECKWITH.